United States Patent
Cox

Patent Number: 6,064,137
Date of Patent: May 16, 2000

[54] METHOD AND APPARATUS FOR A VACUUM THERMIONIC CONVERTER WITH THIN FILM CARBONACEOUS FIELD EMISSION

[75] Inventor: Rodney T. Cox, Hillsboro, Oreg.

[73] Assignee: Borealis Technical Limited, Gibraltar

[21] Appl. No.: 09/414,291

[22] Filed: Feb. 5, 1998

Related U.S. Application Data

[63] Continuation-in-part of application No. 08/610,599, Mar. 6, 1996, abandoned.

[51] Int. Cl.[7] .................................................. H02N 3/00
[52] U.S. Cl. ............................................................ 310/306
[58] Field of Search ................................... 310/306, 307; 136/200, 205; 257/77; 313/310, 495, 496, 346 R, 355, 270; 322/2 R

[56] References Cited

U.S. PATENT DOCUMENTS

| | | | |
|---|---|---|---|
| 4,280,074 | 7/1981 | Bell | 310/306 |
| 5,410,166 | 4/1995 | Kennel | 257/77 |
| 5,487,790 | 1/1996 | Yasuda | 136/200 |
| 5,541,464 | 7/1996 | Johnson et al. | 310/306 |
| 5,551,903 | 9/1996 | Kumar et al. | 445/24 |
| 5,578,886 | 11/1996 | Holmlid et al. | 310/306 |
| 5,675,972 | 10/1997 | Edelson | 62/3.1 |
| 5,699,668 | 12/1997 | Cox | 62/3.1 |
| 5,722,242 | 3/1998 | Edelson | 62/3.1 |
| 5,810,980 | 9/1998 | Edelson | 204/290 R |
| 5,874,039 | 2/1999 | Edelson | 313/310 |
| 5,973,259 | 10/1999 | Edelson | 136/254 |

*Primary Examiner*—Elvin Enad
*Assistant Examiner*—K. Eizo Tamai

[57] ABSTRACT

A Vacuum Diode is constructed in which the electrodes of the Vacuum Diode are coated with a thin film of diamond-like carbonaceous material. The cathode and anode are separated by spacers and a rinse-able material, the rinse-able material which is later removed. Carbonaceous films and the related process for producing a thin film of ablated diamond are not previously known in connection with Vacuum Thermionic Converters, and provide a practical and improved means of constructing such devices.

A Vacuum Thermionic Converter is optimized for the most efficient generation of electricity by utilizing a cathode and anode of very low work function. The relationship of the work functions of cathode and anode are shown to be optimized when the cathode work function is the minimum value required to maintain current density saturation at the desired temperature, while the anode's work function is as low as possible, and in any case lower than the cathode's work function. When this relationship is obtained, the efficiency of the original device is improved. It is further shown that contact potential difference between cathode and anode may be set against the effects of space charge, resulting in an improved device whereby anode and cathode may be set at a greater distance from each other than has been previously envisaged.

18 Claims, 6 Drawing Sheets

METHOD AND APPARATUS FOR A VACUUM THERMIONIC CONVERTER WITH THIN FILM CARBONACEOUS FIELD EMISSION

CROSS REFERENCE TO RELATED DOCUMENTS

This is a Continuation-In-Part of U.S. patent application Ser. No. 08/610,599, filed Mar. 6, 1996 now abandoned.

TECHNICAL FIELD

The present invention is related to thermionic generators, and in particular to an improved thermionic generator for the generation of electricity from heat.

BACKGROUND ART

Thermionic Generators

The thermionic generator, a device for converting heat energy to electrical energy, has been known in the art for many years. It utilizes the same principles as the thermionic vacuum tube, an electronic device in which electrons are driven from a cathode to an anode by the application of a high potential bias.

The thermionic generator, a device for converting heat energy to electrical energy, was first proposed by Schlieter in 1915. This device depends on emission of electrons from a heated cathode. In a thermionic generator, the electrons received at the anode flow back to the cathode through an external load, effectively converting the heat energy from the cathode into electrical energy at the anode. Such devices currently show efficiencies of up to 20% for the energy conversion.

This is not high when compared to conventional means for generating electricity. However, there are advantages to using thermionic generators. Heat sources such as solar energy, which is a renewable resource, may be used. Heat energy which would otherwise be a wasted side-effect of an industrial process may be partially and usefully recycled using such devices. Devices may be manufactured using micro-electronic fabrication techniques, for very small generators, where conventional generators are impractical. When compared to conventional devices, such devices are likely to be smaller, weigh less, and cause little or no pollution.

Typically, the space between cathode and anode in such devices must be very small, and there are difficulties in constructing such devices. Vacuum diodes may require spacings of less than 0.001 inch. The spacing can be increased by the use of low pressure diodes with the space filled with a suitable plasma, such as Cesium gas. However, this advantage brings with it further disadvantages, due to the complexity of analyzing the behavior of gases in such an environment, and the heat exchange reactions within the plasma during the operation of the device, which tend to render it less efficient.

Holmlid (U.S. Pat. No. 5,578,886) teaches carbon use to reduce the work function of the collector electrode of a thermionic converter. He suggests that graphite deposited on the foil collector reacts with the collector material to form a carbide. Through interaction between cesium vapor and the carbon-coated surface, high-energy states of cesium are formed, which reduce the work function of the collector and increase the efficiency of the device.

Kennel (U.S. Pat. No. 5,410,166) also teaches graphite use in thermionic converters. Thermionic converters having graphite electrodes have unexpectedly high current densities during reverse bias operation. The n-p junction flooding phenomenon is suggested to be a definitive explanation for these high current densities.

Neither Holmlid nor Kennel teach that graphite use alone is sufficient to reduce work function: the teaching of the former requires the presence of cesium, whilst the teaching of the latter requires reverse bias operation.

In order to encourage the release of electrons from cathode and anode, surfaces of very low work functions must be constructed. Such surfaces have in the past been characterized by the use of very small points, or tips, which have the effect of increasing the potential gradient by concentrating it at the tips, to render electron emission easier.

The current invention addresses these problems in the construction of thermionic generators by applying a known fabrication process, thin film diamond-like-carbon coating, which has not previously been applied to this field. However, before describing the invention, it is necessary to further describe the principles, operation and construction of vacuum diodes, and in particular their use in thermionic generators and the similarly constructed vacuum diode heat pump, as well as the principles and prior art of thin film carbonaceous coating.

BACKGROUND ART

Pumping Heat with Electrons as a 'Working Fluid'

In Edelson's disclosure, filed Mar. 7, 1995 titled "Electrostatic Heat Pump Device and Method", U.S. Ser. No. 08/401,038, and incorporated herein by reference in its entirety, two porous electrodes were separated by a porous insulating material to form an electrostatic heat pump. In said device, evaporation and ionization of a working fluid in an electric field provided the heat pumping capacity. The use of electrons as the working fluid is disclosed in that application. In Edelson's subsequent disclosure, filed Jul. 5, 1995 titled "Method and Apparatus for Vacuum Diode Heat Pump", U.S. Ser. No. 08/498,199, and incorporated herein by reference in its entirety, an improved device and method for the use of electrons as the working fluid in a heat pumping device is disclosed. In this invention, a vacuum diode is constructed using a low work function cathode. A negative potential bias is applied to the cathode relative to the anode, and electrons are emitted. In the process of emission the electrons carry off kinetic energy, moving heat away from the cathode and dissipating it at an opposing anode. The resulting heat pump is more efficient than conventional cooling methods, as well as being substantially scaleable over a wide range of applications. Fabrication using conventional microelectronic fabrication techniques is possible. The Vacuum Diode Heat Pump device is described in greater detail below, following a discussion of the principles involved in its design and construction.

In Edelson's further subsequent disclosure, filed Dec. 15, 1995 titled "Method and Apparatus for Improved Vacuum Diode Heat Pump", U.S. Ser. No. 08/573,074, and incorporated herein by reference in its entirety, the work function of the anode was specified as being lower than the work function of the cathode in order to optimize efficient operation.

In a yet further subsequent disclosure, filed Dec. 27, 1995 titled "Method and Apparatus for a Vacuum Diode Heat Pump With Thin Film Ablated Diamond Field Emission", U.S. Ser. No. 08/580,282, and incorporated herein by reference in its entirety, Edelson and Cox disclose an improvement to the Vacuum Diode Heat Pump, wherein a particular material and means of construction was disclosed to further improve upon previous methods and devices. This improvement was based upon an article from May 1995 published in Solid State Technology, titled "Diamond-based field emission flat panel displays", by Nalin Kumar, Howard Schmidt and Changgang Xie. This article describes the use of this material for flat panel displays, but did not anticipate the use of this material for cooling or temperature control devices, or for thermionic generators. That disclosure also made use of the technology of diamond films as set forth in a patent titled "Method of seeding diamond", by Mohammad Aslam, patent issue date: Dec. 12, 1995 U.S. Pat. No. 5,474,808. This patent describes how a diamond-particle-laden (DPL) mixture can be applied to a substrate surface in a number of different ways. The choice of application depends upon the mixture itself and also the contemplated use of the coated substrate. Methods of application include dip-coating, spraying such as to cover all or part of a non-planar surface, spraying in a line or pattern, dispensing in a line or pattern, or jet writing in a line or pattern. The spray can be applied either as a coating completely covering the surface, or as a localized coating applied only in a specific location. This can be done with either gas nozzle spray devices or ultrasonic atomizing nozzle spray devices. Aslam discloses that diamond film thickness and uniformity are important in manufacturing thermal sensors, heaters, and other electrical components, where electrical resistivity and accuracy of measurement is important. Aslam does not recognize the importance of this technology for the manufacture of cathodes and anodes for thermionic generators.

That application also made use of the technology of low work-function cathodes as set forth in a patent titled "Electron device employing a low/negative electron affinity electron source", by Xiaodong T. Zhu, et al., patent issue date Feb. 1, 1994 U.S. Pat. No. 5,283,501. They disclose the use of an electron source formed of a layer of single crystal diamond material in having a low or negative work-function cathode. This patent provides another means by which this current application can be built. Zhu et al. only disclose the use of this technology for traditional application such as information signal amplifying devices, video information displays, image detectors, and sensing devices. They do not recognize the importance of this technology for the manufacture of cathodes and anodes for thermionic generators.

The above cited prior art does not recognize the use of diamond deposition and diamond-like carbon deposition in cooling and temperature control devices or in thermionic generators. But it does show that the technology is available to make low work-function carbonaceous films. The use of these films in thermionic generators is unknown in the art.

Edelson's application for a Vacuum Diode Heat Pump with Ablated Thin Film Diamond Field Emission referenced above disclosed that thin film ablated diamond technology as described above could be advantageously applied to the construction of a Vacuum Diode Heat Pump, improving upon previous applications both in efficiency of operation and ease of construction. However, Edelson's work does not recognize the potential of his Vacuum Diode Heat Pump With Ablated Thin Film Diamond Field Emission as a thermionic converter.

The present invention applies the thin film diamond field emission technology disclosed by Edelson and Cox to the construction and operation of a thermionic converter.

BACKGROUND ART

Electron Devices

All electron devices require a physical source of electrons in the form of a cathode. Traditionally, cathodes for vacuum tubes and cathode ray tubes use thermionic emission to produce the electrons. This requires raising cathode materials to very high temperatures either by direct conduction of current or through the use of auxiliary heaters. The process is inefficient, requiring relatively high currents and dissipating much energy to the surrounding area as heat.

Recently, there has been substantial investigation of replacements for the heated thermionic cathodes. Specifically, "cold cathode" devices have attracted much attention. These cathodes may be very efficient because they eliminate the need to heat the cathode material. There are three types of cold cathode known to the art. In the field emission type of cold cathode device, electrons are emitted from the tip of an emitter cone. In the tunnel type of cold cathode device, electrons pass through a thin insulating film by the tunneling effect. In the avalanche type of cold cathode device, the electrons emitted are a fraction of a current that flows through a reverse biased p-n junction of a diode oriented such that the junction is parallel to the surface of the emitter.

While these cold cathode structures can be made in almost any size and may have many applications as single units, their best performance and major application is expected to come from extreme miniaturization, in structures formed of dense arrays. All three types of cold cathode may be manufactured in microscopically small sizes by techniques known to the art of semiconductor microelectronics fabrication. For example, silicon thin-film technology has now advanced to the point where cold cathode structures may be manufactured in arrays of up to 5000 cathodes at packing densities of up to 640,000 per square centimeter.

Cold cathode structures are useful electron sources for applications such as flat panel displays, vacuum microelectronic devices, amplifiers, heat pumps, and electron microscopes. Additional electrodes may be, and commonly are, used to collect and/or control the electron current. This technology is presently undergoing extensive development, with many articles being published and numerous patents being issued. Work in the art has been focused on the development of better emissive structures and materials, the use of such devices in electronic applications, and enhanced methods of fabricating such devices as well as fabricating integrated devices.

BACKGROUND ART

Thermionic Emissions

All material may be characterized by its "work function". The work function is the quantity of energy required to move a single electron from the surface of a neutral sample of the material to free vacuum. Generally the work function is measured in electron volts. This work function may be considered a potential barrier to the escape of electrons from the material. A similar measure used to describe insulating materials is called "electron affinity".

The conduction band electrons of a conductor exhibit a distribution in kinetic energy, much as the individual molecules of a gas move at widely varying speeds. This distribution is related to the common Fermi distribution, often encountered in studies of thermodynamics. Some fraction of the electrons present in the conduction band of the conductor will be moving at such a speed and in such a direction that they may overcome the potential barrier of the work function, and escape the conductor. Positing a lone conductor in space, the escaping electrons will cause a negative charge to be built up in the region surrounding the conductor, while the conductor acquires a positive charge.

However, when additional circuit elements are added and an external electric field is applied, a current can be caused to flow; electrons escape from the cathode, are carried by the electric field to the anode, and are then carried back to the cathode via a conductor. If the source of electric potential is part of the return circuit, then the device is a standard vacuum diode. If the load is additionally part of the return circuit, then we have a vacuum thermionic converter, using the heat applied to the cathode in order to produce an electric current flow. This device is well known in the art as previously stated.

BACKGROUND ART

The Fabrication of Carbon-Based Low Work Function Electrodes

In their article of May 1995 in Solid State Technology, titled 'Diamond-based field emission flat panel displays', Nalin Kumar, Howard Schmidt and Changgang Xie discuss the manufacture of flat panel displays.

In that article, a new broad-area cold cathode based on amorphic diamond (AD) thin-film deposition technology is described. The films are deposited using a laser ablation technique developed at the University of Texas, Dallas, by Professor Carl Collins and his group. The deposited material has a distinct microstructure and properties compared to both chemical-vapor-deposited polycrystalline diamond films and hydrogenated diamond-like carbon.

The basic system uses a pulsed Nd:YAC laser that ablates a graphite target. The ablation plume, containing highly ionized and energetic carbon, impinges on the substrate to be coated, creating a hard, dense, nano-crystalline carbon film. 75%–80% of the available carbon exhibits $sp^2$ "diamond"-bonded carbon, while the remaining material is in the form of $sp^2$ graphitic carbon. The micro-nodules of diamond are continuously self-selecting and are uniformly distributed, ranging from 100 to 500 A in size. Resistibility of these films is on the order of 100 to 10,000 Omega cm. The deposited material has a distinct microstructure and properties compared to both chemical-vapor-deposited-polycrystalline diamond films and hydrogenated diamond-like carbon, and thus has been given the tradename AD.

AD™ has been deposited on various materials including silicon, glass, metals, and polymers at room temperature, achieving thicknesses as high as 1.5 μm over large areas (>3 inch diameter).

AD™ films emit electrons at electric fields lower than 200V/μm compared to greater than 1000V/μm for a flat metal.

The maximum current density tested to date is about 100 μA/mm² continuous. Applying the Fowler-Nordheim equation to these data yields an effective field-emission work function on the order of 0.2 to 0.3 eV. The exact emission mechanism is not well-understood.

The lowering of the cathode work function permits electron emission at low applied voltages compared to the molybdenum metal or silicon typically used in microtip fabrication. One application of the flat thin-film cathode is to replace the microtip cathode with a simple thin film, retaining the conventional triode structure. This design eliminates the complexity of microtip fabrication, but an electron extraction grid with micron-size holes is still required. Fabrication of such a display remains a formidable task since even a single short between a grid hole and the flat cathode can render the whole panel useless.

To avoid this problem, the diamond diode field emission display (DFED) technology has been developed. This structure does not require either microtips or an extraction grid, and consists of simple amorphic diamond stripes on the cathode glass plate and phosphor-coated ITO stripes on the anode plate. The two plates are separated by a suitable distance (10–25 μm) and the pixels are formed at the intersection of cathode and phosphor stripes. The smallest lithographic features are on the order of pixel size. The simplicity and large minimum feature size of this DFED structure lead to high yields and low cost compared to AMLCD and microtip-based triode FEDs.

The feasibility of DFED has been demonstrated by building a small (1 in²) display. The AD™ films are deposited on patterned chromium lines on a soda-lime glass plate, called the cathode plate. The anode plate consists of patterned ITO lines, coated with electrophoretically deposited ZnO powder phosphor. To keep the two plates separated from each other, 25 mm-high electroplated nickel spacers are used. The device is sealed using Torseal epoxy and is pumped with an activated getter.

In conclusion, a demonstration diode-structure matrix-addressed field-emission display incorporating an amorphic diamond cathode has been fabricated. Since the cathode can be manufactured by conventional thin-film deposition technology and readily scaleable laser deposition processes, DFED technology holds the promise of being practical, inexpensive, and manufacturable over large areas.

However, no mention was made in this work on DFED technology regarding the possible application of either AD™ or the method described for applying the material to electrodes with regard to thermionic generators.

BACKGROUND ART

Chemical Vapor Deposition Techniques for Producing Diamond Films

Chemical vapor deposition techniques for producing diamond films require a means of activating gas-phase carbon-containing precursor molecules. Whilst each approach differs in detail, they all share features in common, and generally involve thermal (e.g. hot filament) or plasma (D.C., R.F., or microwave) activation, or use of a combustion flame (oxyacetylene or plasma torches). The resulting films are polycrystalline, having a morphology that is sensitive to the precise growth conditions used. Growth rates for the various deposition processes vary considerably, and it is usually found that higher growth rates can be achieved only at the expense of a corresponding loss of film quality.

For microwave deposition reactors, the deposition rate is approximately linearly proportional to the applied microwave power. Currently, the typical power rating for a microwave reactor is ~5 kW, but the next generation of such reactors have power ratings up to 50–80 kW.

BRIEF DESCRIPTION OF THE INVENTION

The present invention discloses use of carbonaceous materials in the construction and operation of Vacuum Thermionic Converters for the conversion of heat to electricity.

The present invention further utilizes, in one embodiment, the thin film ablated diamond techniques also described above, for the construction of such a thermionic generator for the conversion of heat to electricity.

The cathode and anode of the vacuum diode are constructed from a conductive material, coated with layers of a diamond-like carbon material and held apart by spacers.

When a source of heat is applied to the cathode, such that it is maintained at a temperature greater than that of the anode, heat is carried to the anode by electrons which are emitted and returned in the form of an electron flow, thus generating an electric current which may be drawn from the anode, according to the known principles of the thermionic generator as outlined above.

In addition to the objects and advantages of the methods of constructing and using electrodes in refrigerators and similar devices described in my above patent, several objects and advantages of the present invention are as follows:

An advantage of the present invention is that it allows for a greater distance between the cathode and anode of a thermionic generator than was previously regarded as practical.

Accordingly it is an object of the present invention to eliminate the need for costly and difficult fabrication techniques related to the spacing between anode and cathode of a Vacuum Thermionic Converter.

Another advantage of the present invention is that it enables a specific and available material to be used in the construction of a thermionic generator.

Accordingly it is an object of the present invention to identify a suitable material for the construction of electrodes in a Vacuum Thermionic Converter.

Another advantage of the present invention is that it provides a method for the construction of a thermionic generator using carbonaceous low work function electrodes.

Accordingly it is an object of the present invention to disclose a method for constructing a Vacuum Thermionic Converter which eliminates previous problems in constructing Vacuum Thermionic Converters.

Still further objects and advantages will become apparent from the ensuing description.

REFERENCE NUMERALS IN DRAWINGS

1—Substrate
2—Laser
3—Graphite plate
4—Substrate, cathode
5—spacers
6—diamond, or diamond-like carbon, material
7—rinse-able material
8—conductive substrate, anode
9—ablation plume
10—vacuum thermionic converter
11—lens further member of list:
12—Vacuum
21—Cathode with low work function
22—Anode with low work function
23—Externally applied voltage
24—Anode with high work function
26—Heat Sink
28—Heat Source
30—Insulating Film further members of list:
32—Electrical Load
34—Connecting wires
36—Power Supply

DETAILED DESCRIPTION OF THE INVENTION

FIGS. 1(a) to 1(g) show the steps necessary for the manufacture of a vacuum thermionic converter with diamond or diamond-like carbon film coating.

Figure 1A:
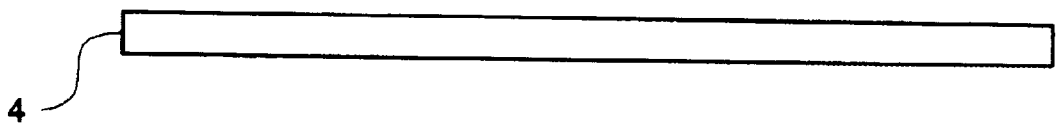
FIGS. 1(a) to 1(g) show the steps necessary for the manufacture of a vacuum thermionic converter with diamond or diamond-like carbon film coating.

FIG. 1a shows a cathode 4, which can be made of metal, preferably nickel.

Figure 1B:
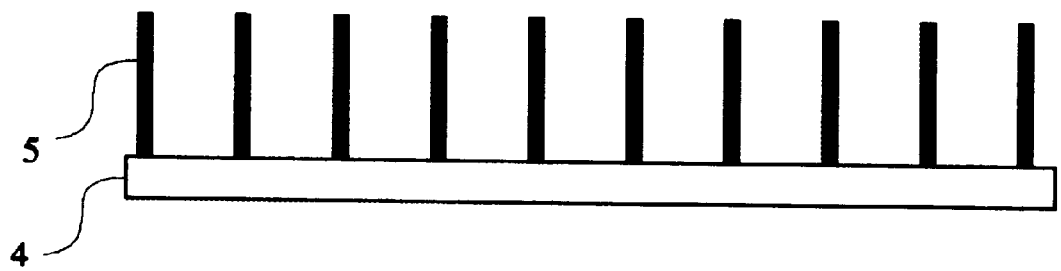

In FIG. 1b cathode 4 supports a multitude of spacers 5, which will later be used to separate cathode 4 and an anode 8. Spacers 5 are constructed of an insulating material. Many such insulating materials are known to the art.

Figure 1C:
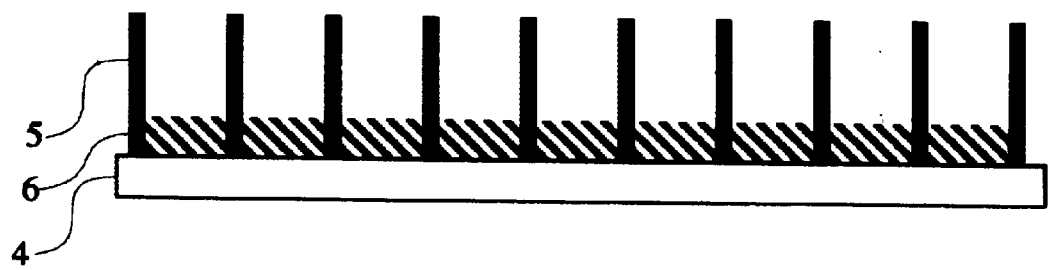

FIG. 1c shows the deposit of a diamond, or diamond-like carbon material film 6 which covers cathode 4. Diamond, or diamond-like carbon material film 6 is not required to touch spacers 5, and not having the diamond, or diamond-like carbon material film 6 in contact with spacers 5 will decrease the thermal loss and will increase the efficiency of the system.

Figure 1D:
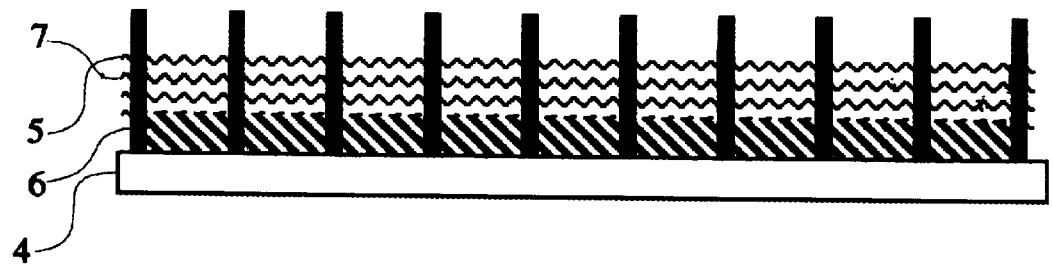

In FIG. 1d, spacers 5 are then surrounded by a rinse-able material 7, which slightly overlaps the surface area of spacers 5. The overlapping of the rinse-able material beyond the surface area of the spacers 5 will serve to prevent the diamond, or diamond-like carbon material, film 6 from making contact with spacers 5, and reduce the thermal contact between film 6 and spacers 5.

Figure 1E:
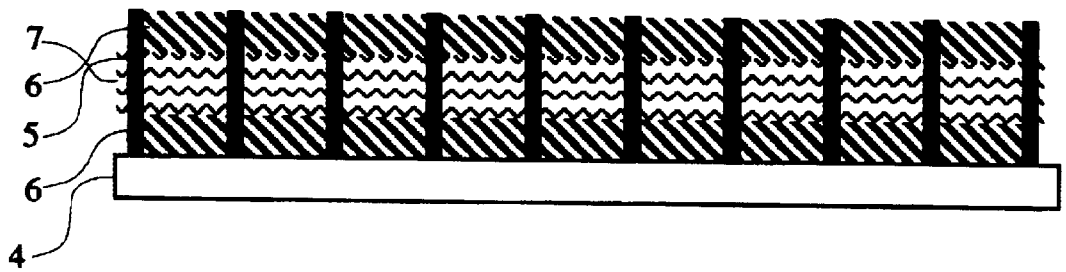

In FIG. 1e, another layer of diamond, or diamond-like carbon material film 6, is deposited over the layer of rinse-able material 7.

Figure 1F:
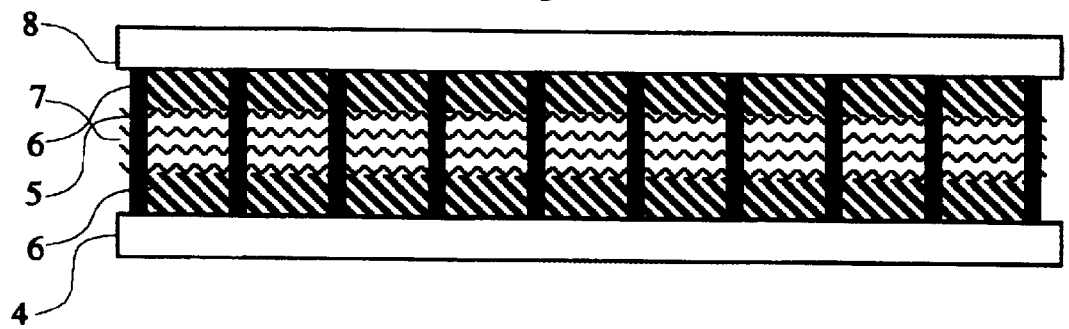

In FIG. 1f, the conductive substrate, or anode 8, is placed on top of the second layer of diamond, or diamond-like carbon material film 6.

In another embodiment, drill holes can be made for aiding in the draining rinse-able material 7 from the diode. This is not shown as it is an optional step.

Figure 1G:
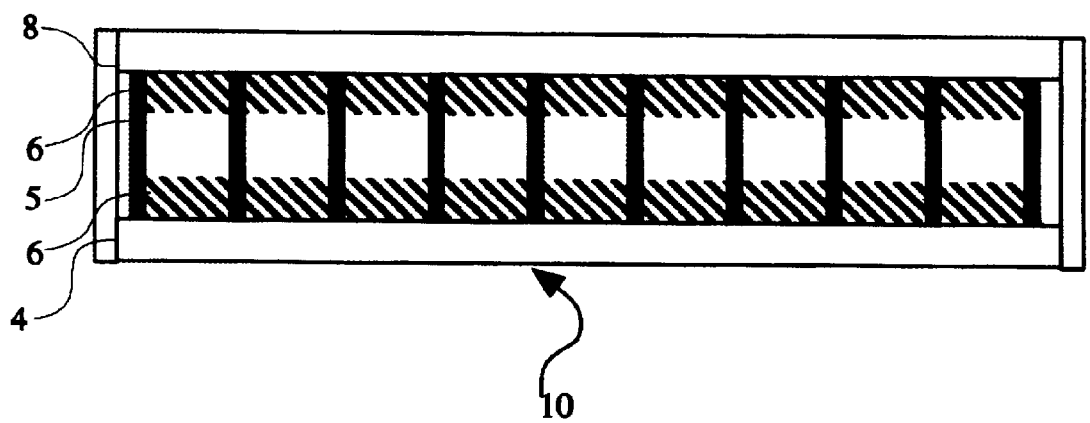

In FIG. 1g, rinse-able material 7 has been drained, the vacuum 12 has been created, and the diode has been sealed.

Figure 2:
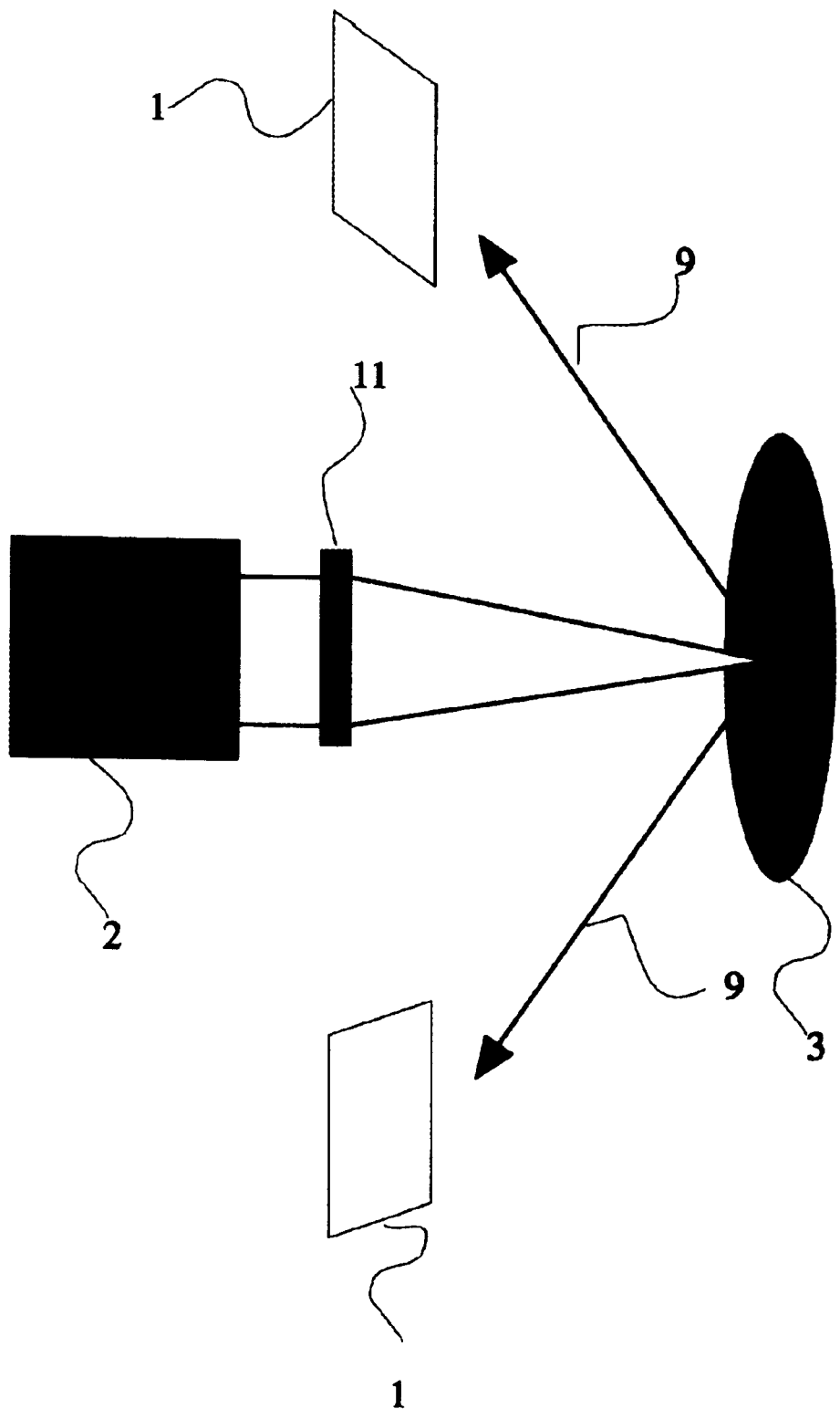
FIG. 2 is a schematic representation of amorphic diamond fabrication.

FIG. 2 is a schematic representation of amorphic diamond fabrication, where a laser 2 is used to ablate carbon such that the it is aimed at a graphite plate 3, which reflects an ablation plume 9 onto a pair of substrates 1.

Figure 3:
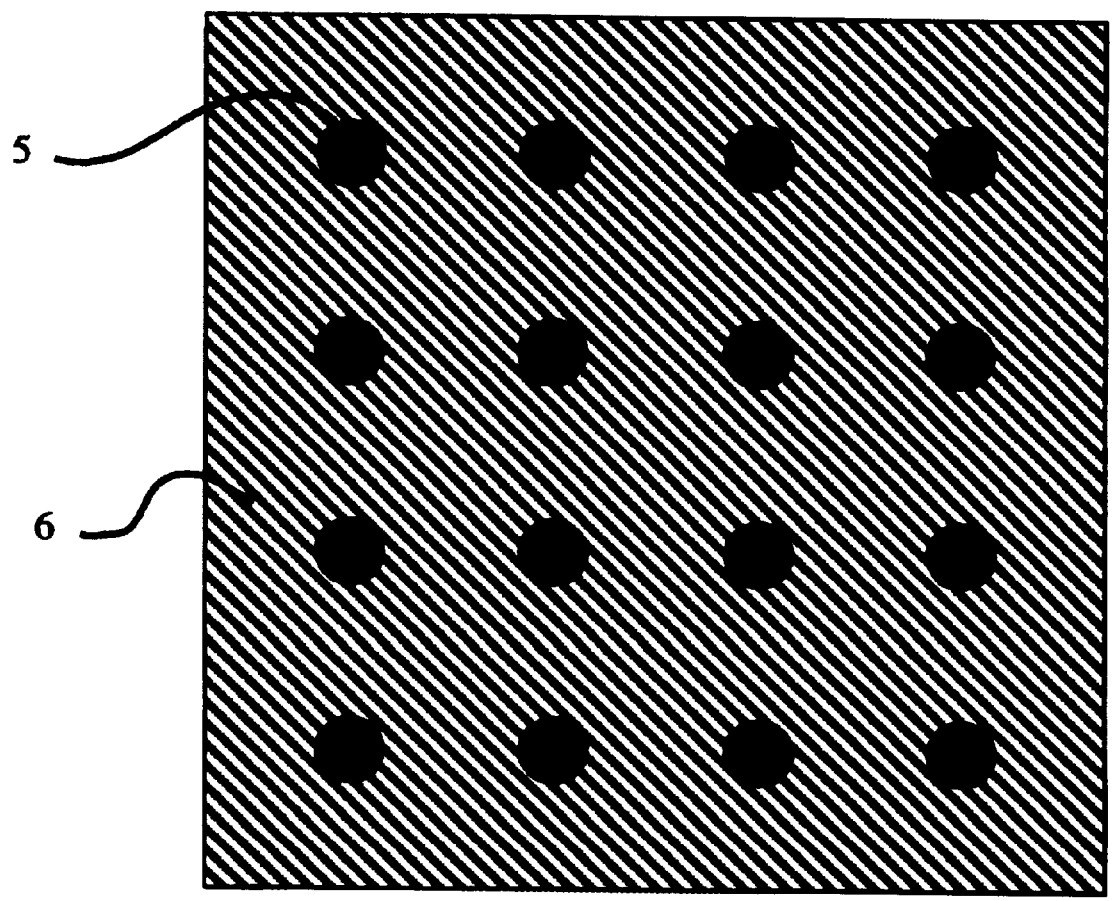
FIG. 3 is a schematic view of the vacuum thermionic converter from above without the anode substrate layer.

FIG. 3 is a schematic view of the vacuum thermionic converter from above without the anode substrate layer 8. Spacers are seen to be regularly interspersed throughout the area of the diode, and are surrounded by the layer of diamond, or diamond-like carbon material film 6.

Figure 4:
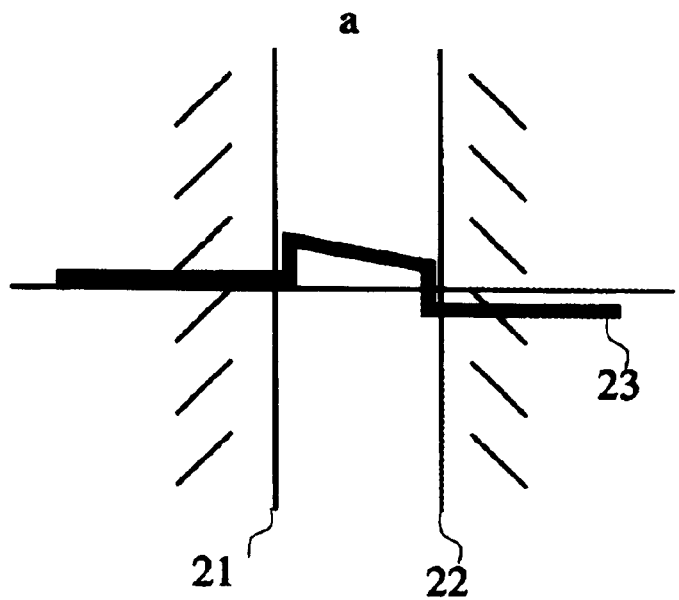
FIG. 4a shows, in schematic form, the potential profile with an efficient relationship between the work functions of cathode and anode in a Vacuum Diode Heat Pump.
FIG. 4b shows, in schematic form, the potential profile with an inefficient relationship between the work functions of cathode and anode in a Vacuum Diode Heat Pump.
Figure 4:
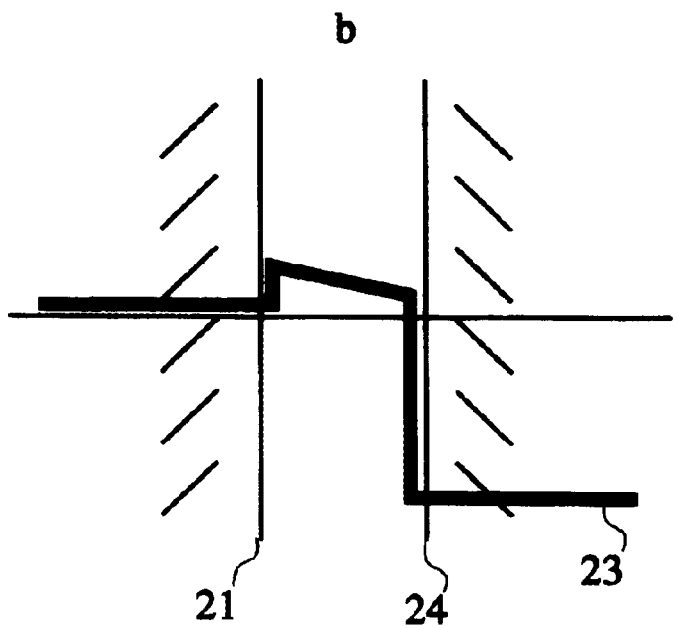

FIG. 4 shows a schematic representation of the impact of comparative work functions on the voltage for the anode and cathode. FIG. 4a shows a schematic of comparative work functions when the anode and cathode have the same work function. FIG. 4b shows an anode of much higher work function than the cathode.

Insulating film 30 is optionally introduced to the surface of the electrodes to further reduce the work function.

Specification of Spacers

In FIG. 1b cathode 4 supports a multitude of spacers 5, which will later be used to separate cathode 4 and an anode 8.

Spacers 5 are constructed of an insulating material. Many such insulating materials are known to the art.

FIG. 1c shows the deposit of the diamond, or diamond-like carbon material film 6 which covers cathode 4. Diamond, or diamond-like carbon material film 6 is not required to touch spacers 5, and not having the diamond, or diamond-like carbon material film 6 in contact with spacers 5 will decrease the thermal loss and will increase the efficiency of the system.

In FIG. 1d, spacers 5 are surrounded by a rinse-able material 7, which slightly overlaps the surface area of spacers 5. The overlapping of the rinse-able material beyond the surface area of the spacers 5 will serve to prevent the diamond, or diamond-like carbon material, film 6 from making contact with spacers 5, and reduce the thermal contact between film 6 and spacers 5.

In FIG. 1e, another layer of diamond, or diamond-like carbon material film 6, is deposited over the layer of rinse-able material 7.

In FIG. 1f, the conductive substrate, or anode 8, is placed on top of the second layer of diamond, or diamond-like carbon material film 6.

In another embodiment, drill holes can be made for aiding in the draining rinse-able material 7 from the diode. This is not shown as it is an optional step.

In FIG. 1g, spacers, plates and films are firmly bonded, the rinse-able material 7 is rinsed away leaving the required gap between anode 8 and cathode 4. The completed unit may then be placed within a vacuum and sealed with a suitable sealant, such as a resin or similar material. Many such materials are well-known to the art. The resulting vacuum diode, when heat is applied to the cathode, will evince the properties of thermionic generation of electricity as described previously, such that heat is carried from by electrons from the cathode, and returned to the cathode from the anode in the form of electrical current.

The space between the cathode and anode will typically be very small, and for the purposes of the preferred embodiment, a spacing of 0.5 $\mu$m is specified. The application of spacers of this very small height is known in the art, and within the capabilities of current micro-machining techniques. However, in Edelson's disclosure of an Improved Vacuum Diode Heat Pump, the effect of contact potential difference in the case of devices where the anode has a lower work function than the cathode was shown to mitigate space charge effects and allow greater spacing between cathode and anode than was otherwise possible.

In another embodiment, spacers are not used, relying instead of the edges of the device for support.

Diamond, Diamond-Like-Carbon, and Carbonaceous Film Coating

One method of coating the substrate with diamond or diamond-like material is shown in FIG. 2, where laser 2 is used to ablate carbon such that the ablation plume 9 is directed at a graphite plate 3, where it is bounced onto a pair of substrates 1, and forms a film on the surface of the substrates 1 according to the principles outlined by Kumar, et al., and referred to above. Thus nodules of diamond will be formed over the surface of the pairs of substrates 1. These nodules will emit electrons in the finished device, replacing the tips used in previous disclosures, referred to above.

The ablated diamond film coating may be applied in a variety of ways. In addition to the AD™ discussed by Kumar, et al., the film coating may be applied via ion beam deposition, chemical vapor deposition, plasma enhanced chemical vapor depositions, microwave-enhanced chemical vapor deposition, or sputter deposition, which are all well-known in the art.

The ion beam deposition method typically involves producing carbon ions by heating a filament and accelerating carbon ions to selected energies for deposit on a substrate or high vacuum environment. Ion beam systems use differential pumping and mass separation techniques to reduce the level of impurities in the carbon ion fluence a rowing film. The chemical vapor deposition and plasma enhanced chemical vapor deposition methods are similar in operation to ion beam deposition. Both methods use the dissociation of organic vapors such as $CH_3OH$, $C_2H_2$, and $CH_3OHCH_3$ to produce both carbon ions and neutral atoms of carbon for deposit on a substrate. Sputtering deposition usually includes two ion sources, one for sputtering carbon from a graphite source onto a substrate, and another ion source for breaking the unwanted graphite bonds in the growing film. For example, an argon ion sputtering gun sputters pure carbon atoms off of a graphite target within a vacuum chamber, and the carbon atoms are condensed onto a substrate. At the same time, another argon ion source co-bombards the substrate to enhance the breakdown of the graphite bonding in favor of a diamond-like or tetrahedral bond in the growing carbon film.

Construction of the Anode

Rinse-able material 7 is now introduced so as to cover the diamond or diamond-like carbon material film 6. This material may be any non-corrosive rinse-able material. Many such materials are known in the art.

A second film of diamond or diamond-like carbon material is then applied over the rinse-able material using the same technique as before. This film forms the surface of the anode. The body of the anode 8 is a metal plate. This plate 8 may be made of nickel for the purpose of the preferred embodiment. The nickel would be added in layers, by techniques well known in the art.

Final Preparation

Once spacers, plates and films are in place, rinse-able material 7 is rinsed away leaving the required gap between anode 8 and cathode 4. The completed unit may then be placed within a vacuum and sealed with a suitable sealant, such as a resin or similar material. Many such materials are known in the art. The resulting vacuum diode, when a heat source is applied to cathode 4 will evince the properties of a thermionic generator described previously, such that cathode 4 emits electrons which carry heat to anode 8, which returns that heat energy in the form of an electron flow, thus creating an electrical current.

Anode Work-Function

Edelson's previous application for an Improved Vacuum Diode Heat Pump disclosed a device in which the work function of the anode was specified to be of lesser magnitude than the work function of the cathode. To properly discuss the operation of a vacuum thermionic generator, the question of the relationship between cathode and anode must be discussed.

In constructing such a Vacuum Diode Heat Pump, attention is paid to the precise relationship of the work function of the cathode to the work function of the anode. There are three possible relationships: that these work functions are equal; that the work function of the cathode is greater than the work function of the anode; and that the work function of the cathode is less than the work function of the anode.

Where the work functions are equal, a small externally applied voltage is sufficient to create a current flow. This is represented schematically in FIG. 4a, where cathode 21 and anode 22 share the same work function. Where a voltage is applied, the overall pattern of externally applied voltage 23 shows an efficient use of the work performed.

But where heat is to be pumped from a cathode of low work function to an anode of a higher work function, maintaining the same level of current flow as with electrodes of equal work function requires that greater external voltage be applied. The greater the difference in work functions, the greater the voltage, and consequently, the efficiency of the device is impaired. This is illustrated in FIG. 4b, where anode 24 is of a high work function, requiring much greater work to be performed by externally applied voltage 23 in order to pump heat.

Consequently, to optimize performance, the cathode will have a work function low enough to obtain an electron emission determined as saturation current density at operational temperatures, and an anode work function which is as low as possible. This is the condition of the vacuum diode heat pump previously described.

There are three limiting factors on the pumping of heat from cathode to anode, which should be noted. The first is the initial barrier height, that is, the work which must be done in order to separate an electron from the body of the cathode in order to create current flow. This is a kinetic limit on the current flow.

Secondly, there is the limiting factor of the space charge region between the electrodes. Electrons in this region travel from a region of high potential to a region of low potential. Electrons in this region alter their potential profile and thus self-regulate the total current flow.

Thirdly, there is the limit of thermodynamic potential. The bulk energy levels of the electrons in the anode and the cathode will move from the hot side to the cold side unless the potential of the hot side is sufficiently below that of the cold side. The minimum potential difference is set by the Carnot formula.

In the case where the work function of the anode is greater than the work function of the cathode, the contact potential difference causes an additional kinetic barrier, thus substantially reducing current flow.

But where the work function of the anode is lower than the work function of the cathode, it would appear at first sight that the potential of the anode may be greater than that of the cathode. Only a small amount of the heat carried by a single electron would be transferred to the anode, and the electron would return through the circuit to the cathode carrying a load. Heat is thereby converted into electricity. This is the thermionic converter of heat to electricity, with which the present invention is concerned.

Thus through the use of a low work function anode, contact potential difference may wholly or partly mitigate space charge effects, and electrode separation may be increased without incurring space charge penalties to the efficiency of the device. It should be noted that if the distance between the electrodes can be increased then there are many more options for the method of fabrication. 0.1 μm is currently difficult to manufacture, while 1 μm is easier to construct. In such circumstances, it is likely that both the cathode and anode are fabricated at the same time using microelectronic fabrication techniques in order to maintain them at an appropriate distance. Owing to the close spacing of the cathode and anode, and the possibility that both may be fabricated together, it becomes meaningful to envisage a sheet-like structure where one side is characterized by absorbing heat, and the other side by rejecting heat. An example mode of operation for conventional electrical generation with a temperature differential of 45 degrees Celsius would generate currents on the order of 30 amp/cm2, cathode work function of 0.3 eV, 0.1 eV anode work function, and electrode spacing of 1 μm to provide a good initial basis for the necessary engineering trade-offs. The necessary spacing between electrodes may be obtained using conventional microelectronic fabrication techniques.

Of primary importance in the development of thermionic refrigeration and thermionic generators is the production of a low work function electrode. However, in Edelson's previous applications, while mention has been made of various possible means of manufacture, and types of material held to be suitable, and specifically of the use of thin film carbonaceous materials as a preferred material, no mention was made of the suitability of such a material for the construction of electrodes for use in a thermionic generator.

Summary, Ramifications and Scope

In the Thermionic converter, the cathode is hotter than the anode and, since the Carnot power requirements are negative, electrical power may be extracted from the system at the anode.

In the preferred embodiment described above, an external heat source is applied to the cathode so as to maintain the necessary thermal differential between cathode and anode. However, in other possible embodiments, this heat source may be applied through the application of a potential bias to the cathode and anode, such that an electrical circuit is created with which to generate a suitable level of heat in the cathode. In other possible embodiments, heat may be drawn by means of suitable conductive materials from industrial processes such as furnaces, hot emissions and motors and applied to the cathode of the invention. For example, a heat pipe or other thermally conductive means may be used to carry the heat to the Thermionic converter's cathode, allowing for the separation of the converter from the heat source over longer distances. A number of possible heat sources are envisaged, including nuclear reactors, fission sources, fusion sources, steam, vaporized gases, biological reactions, chemical reactions, blast furnaces, solar flares, solar energy, radioactive materials, boilers, radiators, friction devices, household appliances, ovens, electrical appliances, electrical components, resistors, furnaces, coal fires, gas fires, immersion heaters, muscular contractions, wood fires, oil fires, gas turbines, wind turbines, water turbines, magma, volcanic reactions, internal combustion engines, geysers, solar power, ionization devices, evaporation devices, electrolytic devices, human body heat, living organisms, fermentation processes, lasers, light emitting diodes, subatomic particle collision, jet engines, rocket motors, compressors, quasars, pulsars, and white holes.

Various heat sinks for the thermionic converter may be utilized, including refrigerators, ice bergs, sea water, deep sea water, cryogenic devices, adsorption devices, Peltier effect devices, fans, air, super cooled gases, wind tunnels, snow, ice, cold water, melt water, and interplanetary space.

The current generated by the Thermionic converter may be used in a number of different ways. In one embodiment, the current is used to power or augment power to other devices, for example providing a source of power to a lighting system.

In another such embodiment, the current may be stored in capacitors or batteries for use in other applications. By so storing the drawn-off heat in the form of electrical power, it may be used in applications where more power is required than is produced on a continual basis by the device.

It should be noted that the above description represents a single embodiment of the invention, and that many embodiments are possible, for example: by applying the given techniques to avalanche or tunnel diodes, to triodes, or in varying the materials, spacing and scale of construction envisaged.

The preferred embodiment of the thermionic converter is in the form of a Vacuum Diode as described above. In other embodiments, different structures may be desirable. The Magnetic Triode allows the anode and cathode of the Thermionic converter to be separated and aligned at a variety of angles. This device includes a third electrode which attracts electrons from the cathode, and deflects them by means of a magnetic field towards the anode.

Other embodiments of the invention may use further types and varieties of thermionic converter, the principle remains the same—the drawing-off of the heat generated at the cathode of the device and converting it to electrical power at the anode which may then be utilized in a multiplicity of ways.

It may be seen from the above description that this improved method for the thermionic generation of electricity provides for the practical construction of a thermionic converter of greater efficiency than was possible with previous devices.

In addition, the above description provides for a simpler method of constructing a thermionic generator than was previously known.

In a further group of possible embodiments, both anode and cathode may be made of different metals, thus varying the characteristics of the device yet again. It is also possible to envisage the use of other techniques for fabricating the thin film of diamond or diamond-like material, other than the techniques described. Other techniques include but are not limited to: application by high current density DC glow discharge; application by cooling a substrate, biasing the substrate, and condensing carbon ions upon the substrate; application by dip-coating the substrate in a carbon-particle-laden mixture; application by spraying all or part of the surface of the substrate with a carbon-particle-laden mixture; application by jet application on the substrate with a carbon-particle-laden mixture; application by ion beam deposition on the substrate; application on the substrate by plasma enhanced chemical vapor deposition; application on the substrate by sputter deposition; and microwave enhanced chemical vapor deposition.

In another group of embodiments, the low work-function carbonaceous material may be type ii-b diamond, amorphic diamond, chemical-vapor-deposited polycrystalline diamond film, hydrogenated diamond-like carbon, amorphous diamond film, amorphous diamond, ablated diamond, diamond material, diamond-like carbon material, non-crystalline diamond-like carbon material, carbonaceous aluminum nitride material, oxygenated or cesiated diamond, oxygenated or cesiated diamond-like material, oxygenated or cesiated diamond or diamond-like material additionally exposed to sodium, potassium, rubidium or lithium, oxygenated or cesiated N-doped diamond or diamond-like material additionally exposed to sodium, potassium, rubidium or lithium, carbonaceous material with geometric discontinuities exhibiting radii or curvature of greater than approximately 1000 Å, a carbonaceous material with a plurality of electron sources each formed of a single crystal diamond material.

In a further embodiment, either or both the cathode and anode may be covered with a layer of insulating material to further reduce work function.

Figure 5:
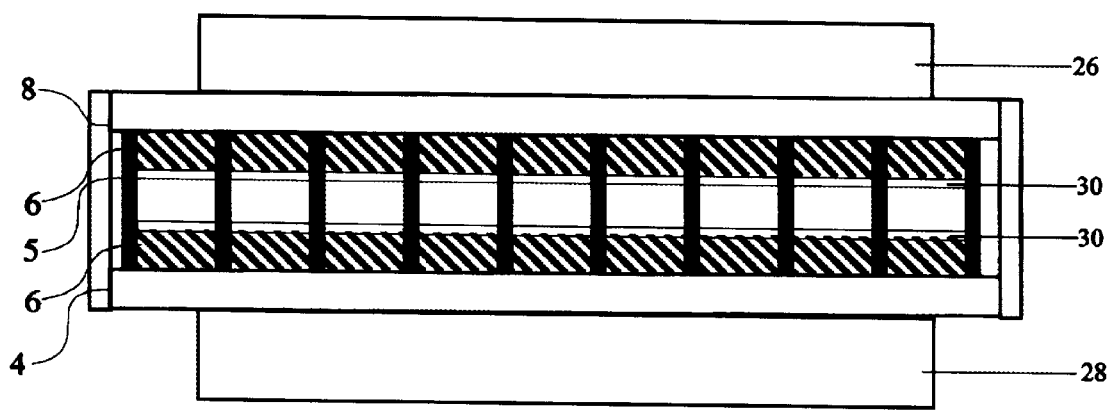
FIG. 5 shows, in schematic form, one embodiment of a thermionic converter.

In a yet further embodiment, an external voltage may be applied between the cathode and the anode of the device to control the rate of electrical generation. This is shown in FIG. 5b.

The method may be successfully exploited using field emission cathode devices, tunnel cathode devices, or avalanche cathode devices.

Although the description above contains many specificities, these should not be construed as limiting the scope of the invention but as merely providing illustrations of some of the presently preferred embodiments of this invention. For example, cold cathodes with higher work functions may be used when dealing with high temperatures. The spacing of cathode and anode may also vary depending on the application involved and the addition of vacuum tubes to assist the flow of electrons from cathode to anode. Thus the scope of the invention should be determined by the appended claims and their legal equivalents, rather than by the examples given.

I claim:

1. A method for building a thermionic converter comprising the steps of:
   a) forming a carbonaceous layer on a substrate forming a first electrode,
   b) establishing a separation means,
   c) forming another carbonaceous layer, separated from said electrode,
   d) adding another substrate to said second carbonaceous layer whereby a second electrode is formed.

2. The method of claim 1, wherein said separation means includes the use of spacers.

3. The method of claim 1 wherein said separation means includes the use of a removable material.

4. The method of claim 3 wherein said removable material is removed before the evacuated space is established.

5. The method of claim 1 wherein said carbonaceous material is not in contact with the separation means, whereby thermal loss is decreased and efficiency is increased.

6. The method of claim 1 wherein said carbonaceous layer is formed using a process selected from a group consisting of high current density dc glow discharge, condensing carbon ions, dip-coating in a carbon-particle-laden mixture, jet application of a carbon-particle-laden mixture, spraying all or part of the surface of said substrate with said carbon-particle-laden mixture, ion beam deposition, chemical vapor deposition, plasma enhanced chemical vapor depositions, sputter deposition, and microwave enhance chemical vapor deposition.

7. A method for making a thermionic converter comprising the steps of:
   a) providing a first electrode having an upper surface;
   b) providing spacers on said upper surface;
   c) depositing a carbonaceous material on said upper surface and between said spacers to form a first carbonaceous layer;

d) depositing a layer of removable material on said first carbonaceous layer;

e) depositing a second carbonaceous layer on said removable material;

f) depositing a second electrode on said second carbonaceous material; and g) removing said removable material.

8. The method of claim 7, wherein said step of removing further comprises:

providing drill holes to remove said removable material.

9. The method of claim 7, wherein said first electrode is a low work function cathode and said second electrode is a low work function anode.

10. The method of claim 7, wherein said first electrode is a low work function anode and said second electrode is a low work function cathode.

11. The method of claim 7, further comprising the step of:

providing a vacuum between said first electrode and said second electrode.

12. The method of claim 7, further comprising the step of:

sealing said thermionic converter with a sealant.

13. The method of claim 7, further comprising the step of:

providing a distance between said first electrode and said second electrode, wherein said distance is very small.

14. The method of claim 7, wherein said distance is 0.5 $\mu$m to 1.0 $\mu$m.

15. The method of claim 7, wherein said step of removing further comprises:

removing said removable material leaving a gap between said first electrode and said second electrode.

16. The method of claim 7, further comprising applying heat to said first electrode to generate a current at said second electrode.

17. The method of claim 7, further comprising coupling a load to at least one of said electrodes.

18. The method of claim 7, wherein said second carbonaceous layer is comprised of a different carbonaceous material than said first carbonaceous layer.

* * * * *